(12) United States Patent
Peace et al.

(10) Patent No.: US 9,184,454 B1
(45) Date of Patent: Nov. 10, 2015

(54) MIXING ARRANGEMENT FOR A FLOW CELL OF AN ENERGY STORAGE SYSTEM

(71) Applicant: Zinc Air Incorporated, Columbia Falls, MT (US)

(72) Inventors: Steven L. Peace, Whitefish, MT (US); Gerald P. Backer, Southfield, MI (US)

(73) Assignee: VIZN ENERGY SYSTEMS, INCORPORATED, Columbia Falls, MN (US)

( * ) Notice: Subject to any disclaimer, the term of this patent is extended or adjusted under 35 U.S.C. 154(b) by 511 days.

(21) Appl. No.: 13/724,315

(22) Filed: Dec. 21, 2012

(51) Int. Cl.
 *H01M 8/04* (2006.01)
 *H01M 8/02* (2006.01)
 *H01M 8/18* (2006.01)
 *H01M 2/38* (2006.01)

(52) U.S. Cl.
 CPC ........ *H01M 8/04276* (2013.01); *H01M 8/0202* (2013.01); *H01M 8/18* (2013.01); *H01M 2/38* (2013.01); *H01M 8/188* (2013.01)

(58) Field of Classification Search
 CPC .......... H01M 8/188; H01M 8/20; H01M 2/38
 See application file for complete search history.

(56) References Cited

U.S. PATENT DOCUMENTS

| | | | | |
|---|---|---|---|---|
| 3,974,049 | A | * | 8/1976 | James et al. ........... 205/348 |
| 4,210,512 | A | | 7/1980 | Lawrance et al. |
| 4,652,504 | A | | 3/1987 | Ando |
| 4,722,773 | A | * | 2/1988 | Plowman et al. ......... 205/525 |
| 5,542,958 | A | | 8/1996 | Furukawa |
| 5,849,430 | A | | 12/1998 | Lee |
| 6,063,525 | A | | 5/2000 | LaFollette |
| 7,964,301 | B2 | | 6/2011 | Fischel et al. |
| 7,976,982 | B2 | | 7/2011 | Nakamura et al. |
| 8,125,767 | B2 | | 2/2012 | Marumo et al. |
| 8,974,940 | B1 | | 3/2015 | Tarrant |
| 2003/0143466 | A1 | | 7/2003 | Goda et al. |
| 2009/0258278 | A1 | * | 10/2009 | Steinberg ............... 429/34 |
| 2010/0035150 | A1 | | 2/2010 | Ando et al. |
| 2010/0108537 | A1 | | 5/2010 | Perego et al. |
| 2011/0027621 | A1 | | 2/2011 | Deane et al. |
| 2011/0114496 | A1 | | 5/2011 | Dopp et al. |
| 2011/0117456 | A1 | | 5/2011 | Kim et al. |
| 2011/0200848 | A1 | | 8/2011 | Chiang et al. |
| 2011/0223451 | A1 | | 9/2011 | Winter et al. |
| 2011/0244277 | A1 | | 10/2011 | Gordon, II et al. |
| 2012/0052347 | A1 | | 3/2012 | Wilson et al. |
| 2013/0049692 | A1 | | 2/2013 | Kuhs |
| 2013/0065122 | A1 | | 3/2013 | Chiang et al. |

OTHER PUBLICATIONS

Andere Bakker et al, "Laminar Flow in Static Mixers with Helical Elements", Updated Feb. 15, 2000—Published in "The Online DVM Book" at http:www.bakker.org.cfm., Copyright 1998 Andre Bakker, pp. 1-11.

Ross Online, Static Mixers for Process Industry Applications— "Static Mixer Designs and Applications" and "Innovation in Motionless Mixers", http://staticmixers.com/, Jun. 6, 2012, 21 pages total.

* cited by examiner

*Primary Examiner* — Jeremiah Smith
(74) *Attorney, Agent, or Firm* — Brooks Kushman P.C.

(57) ABSTRACT

An energy storage system according to the present disclosure includes a cell and an electrolyte supply arrangement for supplying an electrolyte to the cell. The cell has a flow chamber, an electrode and a mixing arrangement positioned in the flow chamber proximate the electrode. The mixing arrangement includes a plurality of ramps that each extend at an angle with respect to the electrode, and each respective ramp defines a void space between the respective ramp and the electrode. Furthermore, the ramps and the void spaces are configured to facilitate mixing of the electrolyte in the flow chamber.

22 Claims, 3 Drawing Sheets

US 9,184,454 B1

MIXING ARRANGEMENT FOR A FLOW CELL OF AN ENERGY STORAGE SYSTEM

TECHNICAL FIELD

The disclosure relates to a mixing arrangement for an energy storage system including one or more cells.

BACKGROUND

An energy storage system, such as a flow battery, may include one or more cells that operate to store energy provided from a source, and to discharge energy to a device to do work. Each cell may have a cathode, an anode and a separator disposed between the cathode and anode for separating chambers of the cell that receive electrolytes. The separator may permit ionic flow between the cathode and anode to facilitate energy storage in the system, as well as discharge of energy from the system.

SUMMARY

An energy storage system according to the present disclosure includes a cell and an electrolyte supply arrangement for supplying an electrolyte to the cell. The cell has a flow chamber, an electrode and a mixing arrangement positioned in the flow chamber proximate the electrode. The mixing arrangement includes a plurality of ramps that each extend at an angle with respect to the electrode, and each respective ramp defines a void space between the respective ramp and the electrode. Furthermore, the ramps and the void spaces are configured to facilitate mixing of the electrolyte in the flow chamber.

A cell according to the present disclosure is also provided for use with an energy storage system having an electrolyte supply arrangement. The cell includes a cell body that defines a flow chamber configured to receive electrolyte from the electrolyte supply arrangement. The cell further includes an electrode arranged in the cell body, and a mixing arrangement positioned in the flow chamber proximate the electrode. The mixing arrangement includes a plurality of ramps that each extend at an angle with respect to the electrode, and each respective ramp defines a void space between the respective ramp and the electrode. Furthermore, the ramps and the void spaces are configured to facilitate mixing of the electrolyte within the flow chamber.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various configurations of energy storage systems. Several specific embodiments are set forth in the following description and in FIGS. 1-8 to provide a thorough understanding of certain embodiments according to the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Furthermore, as those of ordinary skill in the art will understand, one or more features of an embodiment illustrated and described with reference to any one of the Figures may be combined with one or more features illustrated in one or more other Figures to produce embodiments that are not explicitly illustrated or described. In addition, other embodiments may be practiced without one or more of the specific features explained in the following description.

Figure 1:
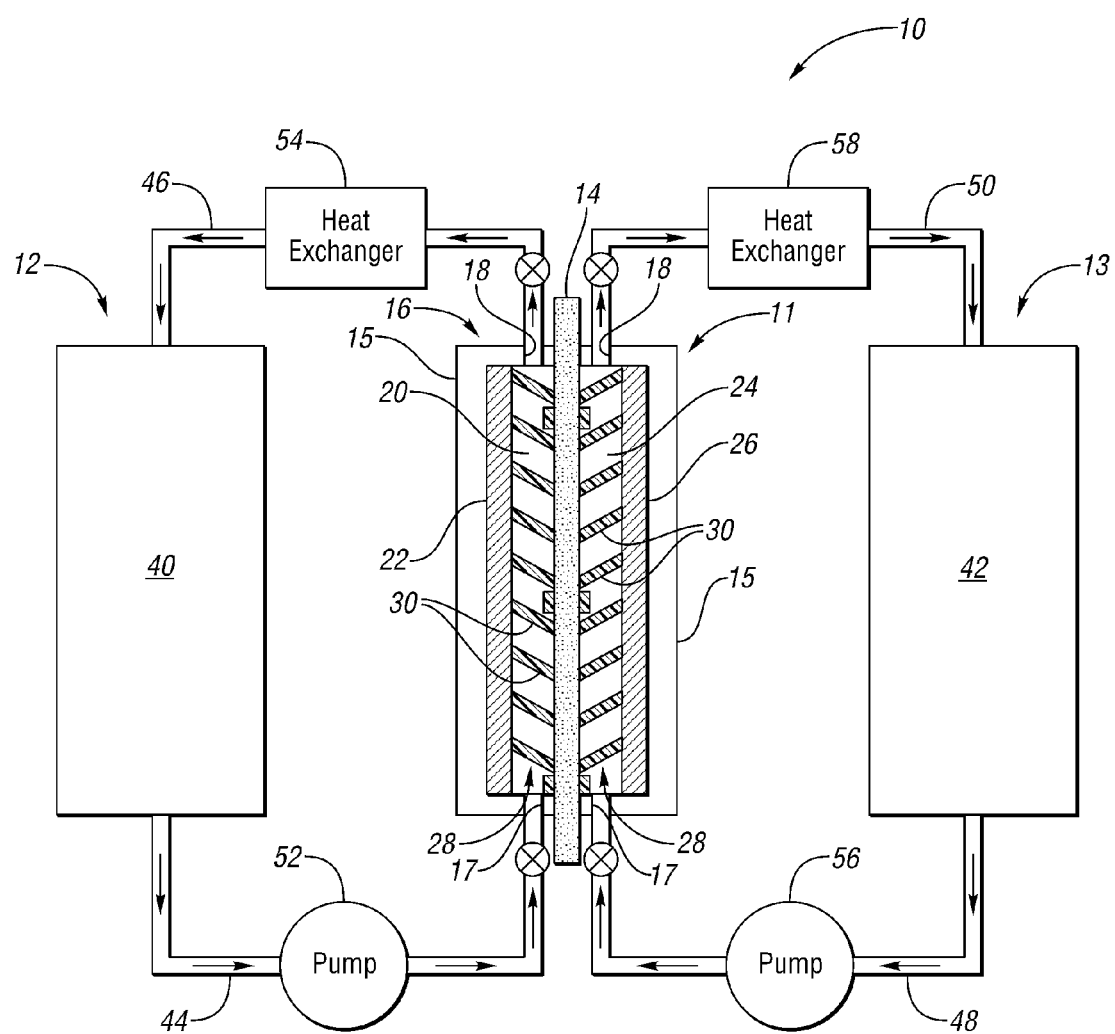
FIG. 1 is a schematic view of an energy storage system, according to the present disclosure, including a cell having first and second flow chambers, an anode adjacent the first flow chamber, a cathode adjacent the second flow chamber, a separator between the anode and cathode, and a mixing arrangement according to the present disclosure disposed in each flow chamber.

FIG. 1 shows an energy storage system 10 according to the present disclosure. In the illustrated embodiment, the system 10 is configured as an electrochemical flow battery that is operable to store energy received from a source, and to discharge energy to one or more devices to do work. For example, the system 10 may be used in electrical utility applications for load leveling, power transmission deferral, wind power integration, and/or solar power integration.

The system 10 shown in FIG. 1 includes a flow cell 11 and first and second electrolyte supply arrangements 12 and 13, respectively, for supplying electrolytes to the cell 11 such that the system 10 forms an electrochemical reactor, as explained below in greater detail. Although the system 10 is shown with a single flow cell 11, the system 10 may include multiple flow cells 11 that are joined together in a cell stack and that each have the same or similar configuration as described below in detail. Examples of cell stacks are disclosed in U.S. patent application Ser. No. 13/196,498, which is hereby incorporated in its entirety by reference.

In the embodiment shown in FIG. 1, the cell 11 includes first and second cell sides, such as an anode side and a cathode side, which are separated by a separator 14 (e.g., an ion exchange membrane). Each cell side includes a body portion or housing part 15, and the housing parts 15 are connected together to form a sealed body or housing 16. Furthermore, each housing part 15 includes an inlet 17 and an outlet 18 in fluid communication with a respective electrolyte supply arrangement 12, 13.

The anode side further includes a first flow field or flow chamber 20 that receives a first electrolyte, such as an anolyte, from the first electrolyte supply arrangement 12, and a first electrode, such as an anode 22, adjacent the chamber 20.

Likewise, the cathode side includes a second flow field or flow chamber 24 that receives a second electrolyte, such as a catholyte, from the second electrolyte supply arrangement 13, and a second electrode, such as a cathode 26, adjacent the chamber 24. The anode side and the cathode side also each include a mixing arrangement 28, according to the present disclosure, positioned in the respective chamber 20, 24 between the respective electrode 22, 26 and the separator 14 for facilitating mixing of the electrolytes, as explained below in detail.

As another example, the cathode side may be provided with a flow feature, such as metal foam or an expanded metal layer, in addition to or instead of the mixing arrangement 28. Such a flow feature may be disposed on and/or attached to the cathode 26, for example.

The anode 22 and cathode 26 may be made of any suitable material and may be electrically connected together to form an electric circuit. For example, the anode 22 may be formed as a lead, tin, zinc, or cadmium coating, or other suitable coating, on an appropriately conductive or nonconductive substrate, such as a steel or plastic plate, and the cathode 26 may be formed as a nickel coating, or other suitable coating, on another appropriately conductive or nonconductive substrate, such as a steel or plastic plate. If the system 10 is provided with multiple cells 11, all of the associated anodes 22 may communicate electrically and/or ionically, and all of the associated cathodes 26 may also communicate electrically and/or ionically. Furthermore, with a multiple cell configuration, the endmost electrodes may function as current collectors. In that regard, with the orientation shown in FIG. 1, the leftmost anode may function to collect current from the other anodes, and the rightmost cathode may function to collect current from the other cathodes. The leftmost anode and the rightmost cathode may also be electrically connected together to form a circuit.

In a multiple cell configuration, the electrodes of adjacent cells may also be formed as bipolar electrodes or electrode assemblies. For example, the system 10 may be provided with electrode assemblies that each have a first portion or side configured as an anode, and a second portion or side configured as a cathode.

The mixing arrangements 28 that are positioned in the chambers 20 and 24 of the cell 11 may each be positioned proximate the respective electrode 22, 26. Furthermore, the mixing arrangements 28 may each be engaged with the separator 14 and the respective electrode 22, 26, such that each mixing arrangement 28 may support the separator 14. In addition, the mixing arrangements 28 may facilitate operation of the system 10. For example, each mixing arrangement 28 may facilitate mixing of the respective electrolyte received in the respective chamber 20, 24, as explained below in more detail.

Figure 2:
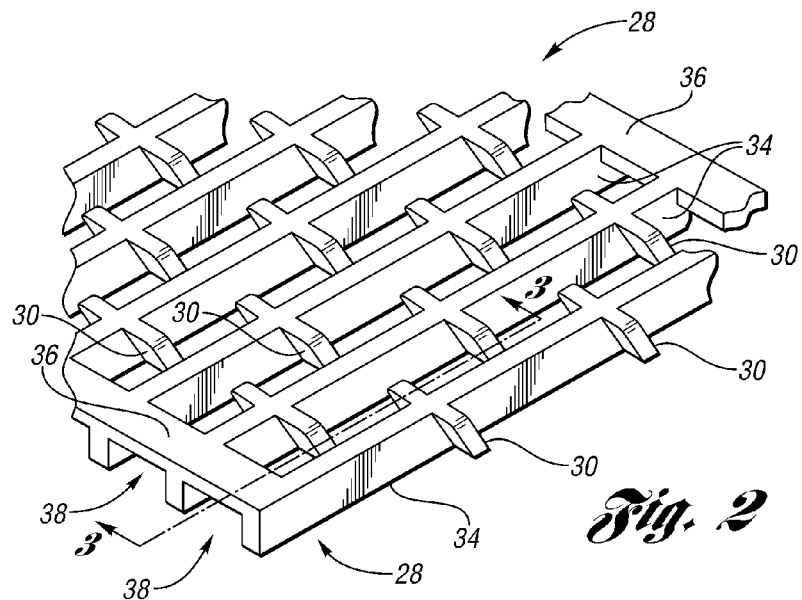
FIG. 2 is a perspective fragmentary view of one of the mixing arrangements shown in FIG. 1.
Figure 3:
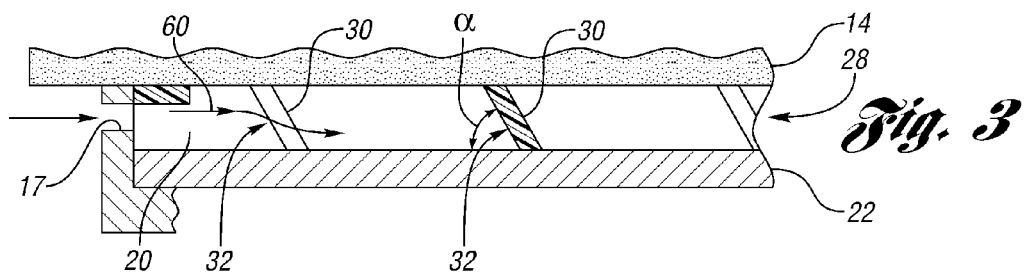
FIG. 3 is a side cross-sectional view of the mixing arrangement shown in FIG. 2, along with a fragmentary view of the corresponding cell.

Referring to FIGS. 2 and 3, an example configuration of the mixing arrangement 28 on the anode side will now be described in detail, with the understanding that the mixing arrangement 28 on the cathode side may have the same or similar configuration. In the embodiment shown in FIGS. 2 and 3, the mixing arrangement 28 includes a plurality of sloping surfaces or ramps 30 that each extend at an angle α, such as an angle in the range of 20 to 70 degrees, with respect to the anode 22. While the ramps 30 may have any suitable configuration, in the illustrated embodiment each ramp 30 is generally planar and extends at an angle of about 60 degrees with respect to the anode 22. Furthermore, each ramp 30 defines a void space 32 between the respective ramp 30 and the anode 22, and the ramps 30 and the void spaces 32 are configured to influence or facilitate mixing of the electrolyte in the anode chamber 20. For example, the ramps 30 and the void spaces 32 may be configured to influence flow of electrolyte toward the anode 22. As a more detailed example, the ramps 30 and the void spaces 32 may cause vortical flow of the electrolyte to direct electrolyte from a center or central portion of the anode chamber 20 toward the anode 22.

Figure 4:
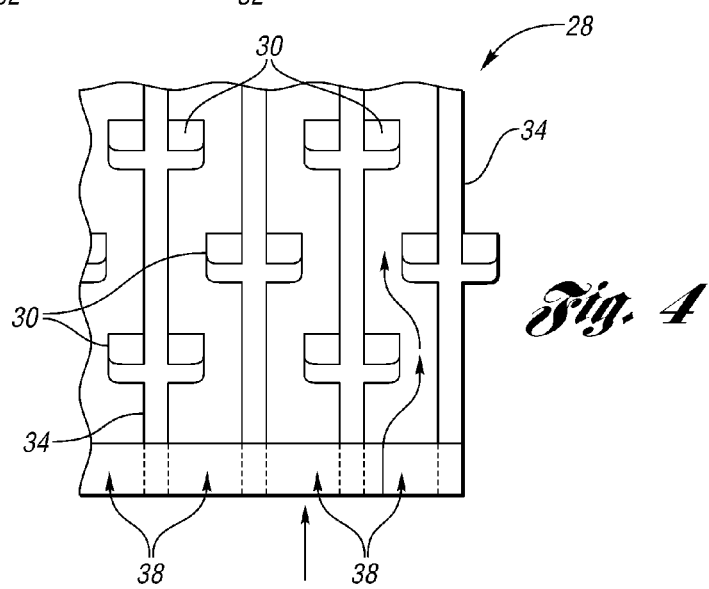
FIG. 4 is a plan view of the mixing arrangement shown in FIG. 2.

In the embodiment shown in FIG. 2, the mixing arrangement 28 further includes multiple longitudinally extending ribs 34 that generally extend in the direction of electrolyte flow, and multiple laterally extending ribs 36 that extend transversely to the longitudinally extending ribs 34. Each longitudinally extending rib 34 is connected to multiple ramps 30, and the ramps connected to each respective rib 34 are staggered with respect to the ramps connected to adjacent ribs 34, as shown in FIGS. 2 and 4. Furthermore, the longitudinally extending ribs 34 define a plurality of flow channels 38 that extend between the inlet 17 and outlet 18, and the ribs 34 may inhibit electrolyte flow between the channels 38 as the electrolyte flows between the inlet 17 and outlet 18. For example, each rib 34 may extend substantially between or entirely between the separator 14 and the anode 22.

Each laterally extending rib 36 is connected to multiple longitudinally extending ribs 34. With such a configuration, the laterally extending ribs 36 may provide structural support to the mixing arrangement 28.

Each mixing arrangement 28 may be made of any suitable material and in any suitable manner. For example, each mixing arrangement 28 may be made of a nonconductive material, such as plastic, or a conductive material, such as metal. As a more detailed example, each mixing arrangement 28 may be made of injection molded plastic.

Returning to FIG. 1, the electrolyte supply arrangements 12 and 13 are configured to supply electrolytes to the chambers 20 and 24 of the cell 11, and the electrolytes function to ionically connect the electrodes 22, 26 of the cell 11. The first electrolyte supply arrangement 12 includes a first electrolyte reservoir, such as a anolyte tank 40, in fluid communication with the anode chamber 20 for storing an anolyte, such as an aqueous solution or slurry containing zinc particles, zinc oxide, iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. Likewise, the second electrolyte supply arrangement 13 includes a second electrolyte reservoir, such as a catholyte tank 42, in fluid communication with the cathode chamber 24 and configured to store a catholyte, such as an aqueous solution containing an electrochemically reducible iron salt, cerium salt, halide, or vanadium oxide; water and alkali metal hydroxide or sulfuric acid; or a non-aqueous solution containing ethylammonium nitrate, imidazolium, sodium hexafluorophosphate, lithium hexafluorophosphate, lithium tetrafluoroborate and/or haloaluminate material or materials. The anolyte tank 40 may be connected to the housing 16 of the cell 11 via an anolyte supply line 44 and an anolyte return line 46, and the catholyte tank 42 may be connected to the housing 16 via a catholyte supply line 48 and a catholyte return line 50. Furthermore, the lines 44, 46, 48 and 50, or portions thereof, may be flexible and/or extendable to accommodate opening and closing of the cell 11.

The first electrolyte supply arrangement 12 may further include an anolyte circulation pump 52 for moving anolyte between the anolyte tank 40 and the anode chamber 20, a first heat exchanger 54 for controlling temperature of the anolyte, and suitable valves for controlling flow of the anolyte. Likewise, the second electrolyte supply arrangement 13 may include a catholyte circulation pump 56 for moving catholyte between the catholyte tank 42 and the cathode chamber 24, a second heat exchanger 58 for controlling temperature of the catholyte, and suitable valves for controlling flow of the catholyte.

Referring to FIGS. 1-4, operation of the system 10 will now be described in more detail. When the cell 11 is in a closed position shown in FIG. 1, the system 10 may function in a charge mode or a discharge mode. In the charge mode, the system 10 accepts electrical energy from a source and stores the energy through chemical reactions. In the discharge mode, the system 10 may convert chemical energy to electrical energy, which is released to a load in order to do work. In either mode, the separator 14 may facilitate chemical reactions, such as oxidation and reduction reactions at the electrodes 22,26, by allowing ions to pass therethrough from one chamber 20, 24 of the cell 11 to the other chamber 20, 24.

The mixing arrangements 28 positioned in the chambers 20 and 24 of the cell 11 may provide numerous benefits during operation of the system 10. First, each mixing arrangement 28 may enhance mixing of the respective electrolyte received in the respective chamber 20, 24, to thereby ensure that generally uniform electrolyte component concentrations (e.g., ion concentrations) are provided across the respective electrode 22, 26 from the respective inlet 17 to the respective outlet 18 of the cell 11. For example, regarding the anode side and with reference to FIGS. 1, 2 and 4, when electrolyte supplied from the electrolyte supply arrangement 12 flows through the anode chamber 20 in a flow direction 60, mixing of the electrolyte may be enhanced by the ramps 30 and the void spaces 32. In that regard, referring to FIG. 3, because the ramps 30 slope toward the anode 22 in the flow direction 60, the ramps 30 may direct flow of the electrolyte toward the anode 22. As a result, reduction or thinning of an electrolyte boundary layer at or near the anode 22 may occur. Furthermore, referring to FIG. 4, the staggered configuration of the ramps 30 may enhance mixing of the electrolyte in lateral directions. As a result, concentration of ions in the electrolyte, such as zincate ions ($Zn(OH)_4^{2-}$), may be maintained at a relatively uniform level across the active surface of the anode 22. In that regard, flow modeling performed on the above mixing arrangement configuration has shown that the concentration gradient of zincate ions along the length and width of an electrode surface may be significantly more uniform compared to a system having a screen arrangement provided without ramps, as well as a system having an open flow chamber configuration.

Second, because the longitudinally extending ribs 34 define flow channels 38 for the electrolyte, the longitudinally extending ribs 34 may minimize lateral flow variations across the active surface of each electrode 22, 26. As a result, ion concentrations along the length of each channel 38 may remain relatively uniform.

Third, each mixing arrangement 28 may engage the separator 14 and support the separator 14. As a result, stress on the separator 14, as a result of flow and/or pressure variations, may be reduced.

Figure 5:
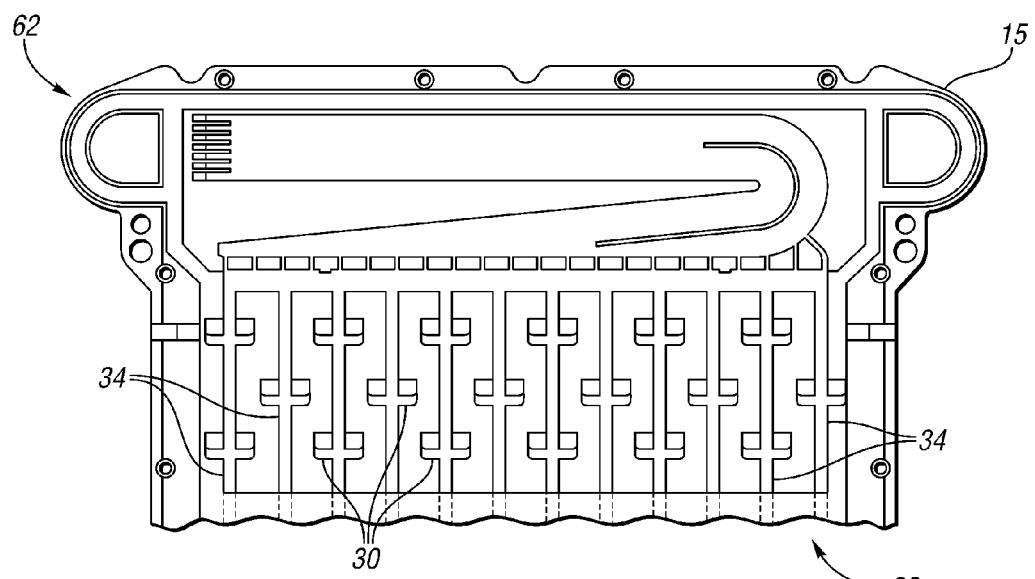
FIG. 5 is a fragmentary plan view of a mixing arrangement formed integrally with a cell housing part.

Fourth, referring to FIG. 5, each mixing arrangement 28 may be formed integrally with the corresponding housing part 15. For example, each mixing arrangement 28 and corresponding housing part 15 may be made of injection molded plastic material, such that each mixing arrangement 28 and corresponding housing part 15 are formed as a single component 62. With such a configuration, manufacturing costs can be reduced.

Figures 6, 7, 8:
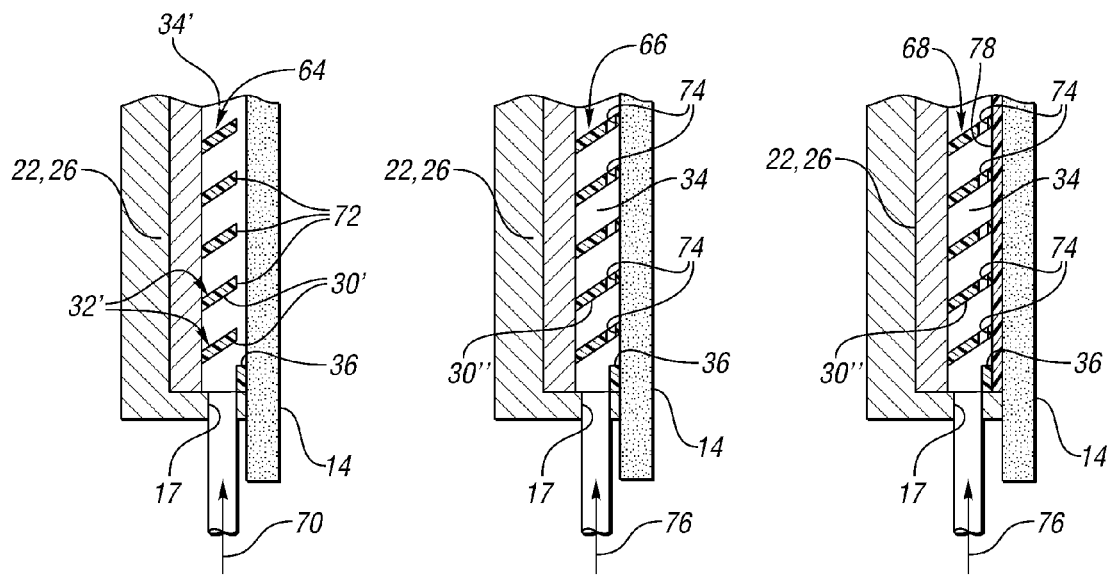
FIG. 6 is a fragmentary side view of another embodiment of a mixing arrangement, according to the present disclosure, mounted in a cell.
FIG. 7 is a fragmentary side view of yet another embodiment of a mixing arrangement, according to the present disclosure, mounted in a cell.
FIG. 8 is a fragmentary side view of still yet another embodiment of a mixing arrangement, according to the present disclosure, mounted in a cell.

Additional embodiments 64, 66 and 68 of a mixing arrangement for use with the cell 11 are shown in FIGS. 6, 7 and 8. These mixing arrangements 64, 66 and 68 may be used on the anode side and/or cathode side of the cell 11, as discussed above with respect to the mixing arrangements 28.

The mixing arrangement 64 shown in FIG. 6 is similar to the mixing arrangement 28 and includes similar features, which are identified with similar reference numbers. Each ramp 30' of the mixing arrangement 64, however, slopes away from the corresponding electrode 22 or 26 in an electrolyte flow direction 70. Furthermore, ends 72 of the ramps 30' are spaced away from the separator 14. With this configuration, the ramps 30' and corresponding void spaces 32' cause vortexes to be generated behind the ramps 30' as electrolyte flows over the ramps 30'. As a result, vortical flow around the sides and end 72 of each ramp 30' facilitates or causes flow of the electrolyte from a central portion of the corresponding chamber 20 or 24 toward the corresponding electrode 22 or 26. Alternatively, each ramp 30' may extend to the separator 14 such that vortical flow only occurs around sides of the ramps 30'.

The mixing arrangement 66 shown in FIG. 7 is similar to the mixing arrangement 64 and includes similar features, which are identified with similar reference numbers. Each ramp 30" of the mixing arrangement 66, however, extends to or near the separator 14, and has an aperture 74 located proximate the separator 14. With this configuration, the ramps 30" can provide support to the separator 14, while still allowing electrolyte flow through and around the ramps 30". Specifically, electrolyte flowing in the flow direction 76 may travel at least partially up or along a particular ramp 30" and then through a respective aperture 74 or along a side of the ramp 30".

The mixing arrangement 68 shown in FIG. 8 is similar to the mixing arrangement 66 and includes similar features, which are identified with similar reference numbers. The mixing arrangement 68, however, further includes a cover layer 78 connected to the ramps 30" and/or ribs 34, 36, and positioned between the ramps 30" and the separator 14. While the cover layer 78 may be made of any suitable material, in one embodiment the cover layer 78 is made of a woven fabric. Furthermore, the cover layer 78 may be configured to inhibit material, which may deposit on the corresponding electrode 22 or 26 during operation of the system 10, from damaging the separator 14. For example, during a charging operation, the cover layer 78 may inhibit zinc dendrites that deposit on the anode 22 from damaging the separator 14.

Other embodiments of mixing arrangements according to the present disclosure may be formed by combining one or more features disclosed above with respect to one embodiment with one or more features of another embodiment. For example, the above described cover layer 78 may be combined with any of the other above-described embodiments.

Furthermore, any of the above mixing arrangement embodiments may be used with any suitable cell. For example, any of the above embodiments may be used on a flow side of a cell that also has a non-flow side on an opposite side of a corresponding separator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy storage system comprising:
   a cell having a flow chamber, an electrode and a mixing arrangement positioned in the flow chamber proximate the electrode, the mixing arrangement including a plurality of ramps formed by planar protrusions that each extend from the electrode at an acute angle with respect to the electrode, wherein each respective ramp defines a void space between the respective ramp and the electrode; and an electrolyte supply arrangement for supplying an electrolyte to the cell;

wherein the ramps and the void spaces are configured to facilitate mixing of the electrolyte in the flow chamber.

2. The energy storage system of claim 1 wherein the ramps and the void spaces are configured to cause vortical flow of the electrolyte to direct electrolyte from a center portion of the flow chamber toward the electrode.

3. The energy storage system of claim 1 wherein each ramp slopes away from the electrode in a flow direction of the electrolyte.

4. The energy storage system of claim 1 wherein each ramp slopes toward the electrode in a flow direction of the electrolyte.

5. The energy storage system of claim 1 wherein the mixing arrangement includes a plurality of longitudinally extending ribs for supporting the ramps, and wherein each rib is connected to multiple ramps.

6. The energy storage system of claim 5 wherein the longitudinally extending ribs define a plurality of flow channels, and the ribs inhibit electrolyte flow between the channels.

7. The energy storage system of claim 5 wherein the ramps connected to one of the ribs are staggered with respect to the ramps connected to another one of the ribs to facilitate lateral mixing of the electrolyte.

8. The energy storage system of claim 1 wherein the cell further comprises an ion-permeable separator membrane, and the mixing arrangement further comprises an outer layer positioned between the ramps and the separator membrane, the outer layer being configured to inhibit metal dendrites that form on the electrode during operation from damaging the separator membrane.

9. The energy storage system of claim 1 wherein the cell further comprises a separator, and the mixing arrangement is positioned between the separator and the electrode such that the ramps contact the electrode.

10. The energy storage system of claim 9 wherein the ramps are spaced away from the separator.

11. The energy storage system of claim 9 wherein the ramps contact the separator, and each ramp has an aperture proximate the separator for allowing electrolyte to flow through the ramp.

12. The energy storage system of claim 1 wherein the cell comprises a housing that receives the electrode, and wherein the mixing arrangement is formed integrally with the housing.

13. A cell for use with an energy storage system having an electrolyte supply arrangement, the cell comprising:

a cell body that defines a flow chamber configured to receive electrolyte from the electrolyte supply arrangement;

an electrode arranged in the cell body; and a mixing arrangement positioned in the flow chamber proximate the electrode, the mixing arrangement including a plurality of ramps formed by generally planar protrusions that each extend from the electrode at an acute angle with respect to the electrode, wherein each respective ramp defines a void space between the respective ramp and the electrode, and wherein the ramps and the void spaces are configured to facilitate mixing of the electrolyte within the flow chamber.

14. The cell of claim 13 wherein the mixing arrangement is made of plastic and is formed integrally with the cell body.

15. The cell of claim 13 wherein the ramps are each generally rectangular.

16. The cell of claim 13 wherein the ramps and the void spaces are configured to cause vortical flow of the electrolyte to direct electrolyte from a central portion of the flow chamber toward the electrode.

17. The cell of claim 13 further comprising an ion-permeable separator membrane configured to allow ions to pass from one side of the separator membrane to another side of the separator membrane, and wherein the mixing arrangement further comprises an outer layer positioned between the ramps and the separator membrane, the outer layer being configured to inhibit material that deposits on the electrode during operation from damaging the separator membrane.

18. The cell of claim 13 further comprising an ion-permeable separator membrane configured to allow ions to pass from one side of the separator membrane to another side of the separator membrane, and wherein the mixing arrangement is positioned between the separator membrane and the electrode such that the ramps are spaced away from the separator membrane.

19. The cell of claim 13 further comprising an ion-permeable separator membrane configured to allow ions to pass from one side of the separator membrane to another side of the separator membrane, and wherein the mixing arrangement is positioned between the separator membrane and the electrode such that the ramps contact the separator membrane and the electrode, and each ramp has an aperture proximate the separator membrane for allowing electrolyte to flow through the ramp after the electrolyte has traveled at least partially up the ramp.

20. The cell of claim 13 wherein the mixing arrangement includes a plurality of longitudinally extending ribs that are each connected to multiple ramps, and wherein the longitudinally extending ribs define a plurality of flow channels for the electrolyte.

21. An energy storage system comprising:

a cell having a flow chamber, an electrode and a mixing arrangement positioned in the flow chamber proximate the electrode, the mixing arrangement including a plurality of ramps that each extend at an angle with respect to the electrode, wherein each respective ramp defines a void space between the respective ramp and the electrode; and an electrolyte supply arrangement for supplying an electrolyte to the cell;

wherein the ramps and the void spaces are configured to facilitate mixing of the electrolyte in the flow chamber;

wherein the cell further comprises an ion-permeable separator membrane, and the mixing arrangement further comprises an outer layer positioned between the ramps and the separator membrane, the outer layer being configured to inhibit metal dendrites that form on the electrode during operation from damaging the separator membrane.

22. An energy storage system comprising:

a cell having a flow chamber, an electrode and a mixing arrangement positioned in the flow chamber proximate the electrode, the mixing arrangement including a plurality of ramps that each extend at an angle with respect to the electrode, wherein each respective ramp defines a void space between the respective ramp and the electrode; and an electrolyte supply arrangement for supplying an electrolyte to the cell;

wherein the ramps and the void spaces are configured to facilitate mixing of the electrolyte in the flow chamber;

wherein the cell further comprises an ion-permeable separator, and the mixing arrangement is positioned between the separator and the electrode such that the ramps contact the electrode and each ramp has an aperture proximate the separator for allowing electrolyte to flow through the ramp.

* * * * *